(12) United States Patent
Ryu et al.

(10) Patent No.: US 9,193,173 B1
(45) Date of Patent: Nov. 24, 2015

(54) METHOD AND APPARATUS FOR PREVENTING ILLEGITIMATE EXIT OF PRINTED DOCUMENT BY APPLYING SECURITY MATERIAL

(71) Applicant: ELECTRONICS AND TELECOMMUNICATIONS RESEARCH INSTITUTE, Daejeon (KR)

(72) Inventors: Seung Jin Ryu, Daejeon (KR); Min Sik Kim, Daejeon (KR); Han Jun Yoon, Daejeon (KR); Do Hoon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/714,306

(22) Filed: May 17, 2015

(30) Foreign Application Priority Data

Jul. 15, 2014 (KR) ........................ 10-2014-0088900

(51) Int. Cl.
*B41J 3/407* (2006.01)
*B41J 3/01* (2006.01)
*G06T 1/00* (2006.01)
*G06Q 30/00* (2012.01)
*G07D 7/00* (2006.01)
*G07D 7/20* (2006.01)

(52) U.S. Cl.
CPC ............... *B41J 3/01* (2013.01); *G06Q 30/0185* (2013.01); *G06T 1/0021* (2013.01); *G07D 7/0033* (2013.01); *G07D 7/2033* (2013.01)

(58) Field of Classification Search
CPC ......... B41J 3/407; B41J 11/009; G06F 21/10; G06F 21/00; G06T 1/0021; G06Q 30/0185; G07D 7/0033; G07D 7/002; G06K 7/10792; G06K 19/06046; G06K 19/06112
USPC ........ 347/101, 106, 107; 713/176; 726/32, 33
See application file for complete search history.

(56) References Cited

U.S. PATENT DOCUMENTS 7,162,035 B1 * 1/2007 Durst .................. G06K 19/086 380/54
8,171,567 B1 * 5/2012 Fraser .................. G06T 1/0021 713/176
2011/0309910 A1 12/2011 Lee

FOREIGN PATENT DOCUMENTS

JP 2012-150348 A 8/2012
KR 10-2007-0027813 A 3/2007
(Continued)

OTHER PUBLICATIONS

J. A. Briffa et al., "Imperceptible Printer Dot Watermarking for Binary Documents," Proc. of SPIE7723, Optics, Photonics, and Digital Technologies for Multimedia Applications, 2010.

*Primary Examiner* — An Do
(74) *Attorney, Agent, or Firm* — LRK Patent Law Firm (57) ABSTRACT

An apparatus and method for preventing the illegitimate exit of a printed document by applying a security material. The apparatus includes an exit registration unit, a security printer unit, an exit management server unit, and an illegitimate exit detection unit. The exit registration unit generates information about the printed document of an electronic document, and sends the information to register the information about the printed document. The security printer unit prints the content and security identifier of the electronic document, and generates a secure printed document by applying a security material. The exit management server unit records and determines whether the secure printed document has been exited. The illegitimate exit detection unit detects the security material of the secure printed document, generates an exit warning, analyzes the security identifier, and determines whether the secure printed document is to be exited.

16 Claims, 10 Drawing Sheets

(56) References Cited

FOREIGN PATENT DOCUMENTS

| KR | 10-2008-0107977 | A | 12/2008 |
|----|-----------------|---|---------|
| KR | 10-0933175 | B1 | 12/2009 |
| KR | 10-2011-0126953 | A | 11/2011 |
| KR | 10-2014-0014901 | A | 2/2014 |
| KR | 10-1377663 | B1 | 3/2014 |
| WO | 2008/150133 | A2 | 12/2008 |

* cited by examiner

METHOD AND APPARATUS FOR PREVENTING ILLEGITIMATE EXIT OF PRINTED DOCUMENT BY APPLYING SECURITY MATERIAL

CROSS-REFERENCE TO RELATED APPLICATION

This application claims the benefit of Korean Patent Application No. 10-2014-0088900, filed Jul. 15, 2014, which is hereby incorporated by reference herein in its entirety.

BACKGROUND

1. Technical Field

The present invention relates generally to a method and apparatus for preventing the illegitimate exit of the printed document of an electronic document and, more particularly, to a method and apparatus that are capable of preventing the illegitimate exit of a printed document in such a way as to generate a secure printed document by additionally applying a security material to printing paper on which the content and identifier of an electronic document have been printed, detect the security material, and recognize the content of the security identifier.

2. Description of the Related Art

With the development of technologies by companies, the illegitimate exit of advanced industrial technologies continues to increase. The illegitimate exit of technology is chiefly performed by an insider who cleverly makes use of the drawbacks of an existing security system. Accordingly, there is a need for a technology for preventing the illegitimate exit of an output confidential document or drawing.

A related technology for preventing the illegitimate exit of a printed document proposes printing paper for security. For example, Korean Patent Application Publication No. 10-2008-0107977 entitled "Paper for Security and Method of Manufacturing the Same" discloses a technology in which a detection tag is inserted into printing paper so that a printed document output onto the printing paper is detected when the printed document passes through a detection gate. However, it is not possible to find a person who has actually output the printed document, and it is difficult to distinguish between a case where the printed document can be exited and a case where the printed document should not be exited.

As another related technology, Korean Patent Application Publication No. 10-2011-0126953 entitled "Apparatus and Method for Securely Distributing Internal Documents" provides a method of tracking the illegitimate use of an internal document by inserting a watermark into the original internal document. In this technology, however, the illegitimate exit of an internal document into which the watermark has been inserted cannot be detected.

As described above, the related technologies for preventing the illegitimate exit of a printed document have a limitation in terms of the performance of approval for printed document exit, the prevention of the illegitimate exit of the printed document, and the information recording of the printed document depending on whether the exit of the printed document has been permitted.

SUMMARY

At, least some embodiments of the present invention are directed to the provision of a method, apparatus, and system for performing approval for printed document exit, the prevention of the illegitimate exit of the printed document, and the information recording of the printed document depending on whether the exit of the printed document has been permitted.

At least some embodiments of the present invention are intended to the provision of a method, apparatus, and system for registering the exit of a printed document.

At least some embodiment of the present invention are intended to the provision of a method, apparatus, and system for generating a secure printed document by printing the content and security identifier of an electronic document onto common printing paper and applying a security material to the printing paper.

At least some embodiments of the present invention are intended to the provision of a method, apparatus, and system for detecting a security material and a security identifier from a secure printed document.

In accordance with an aspect of the present invention, there is provided a method of preventing the illegitimate exit of a printed document by applying a security material, the method including: an exit registration step of generating, by an exit registration apparatus, information about the printed document of an electronic document and sending, by the exit registration apparatus, the information to an exit management server so that the information about the printed document is registered; a secure document output step of printing, by a security printer, the content and security identifier of the electronic document on printing paper, applying, by the security printer, a security material to the printing paper, and outputting, by the security printer, a secure printed document; and a printed document exit checking step of checking, by an illegitimate exit detection apparatus, whether the security material has been applied to the secure printed document, detecting, by the illegitimate exit detection apparatus, the security identifier, and determining, by the illegitimate exit detection apparatus, whether the secure printed document is to be exited; wherein the security identifier include the information about the printed document of the electronic document, and the information about the printed document of the electronic document includes information about a unique value that can uniquely identify the printed document.

The exit registration step may include steps of: generating the unique value that can uniquely identify the electronic document; sending the information about the printed document, including the unique value, to the exit management server; and registering, by the exit management server, the information about the printed document.

The secure document output step may include steps of: printing, by the security printer, the security identifier on the printing paper; printing the content of the electronic document on the printing paper; and applying the security material to the printing paper.

The step of printing, by the security printer, the security identifier on the printing paper may include steps of: calculating the unique value that is information about the electronic document and information that can identify the electronic document; generating the security identifier corresponding to the unique value; and printing the security identifier on the printing paper, and outputting the printing paper.

The step of applying the security material to the printing paper may include steps of: analyzing a security level of the electronic document; and applying a different security material corresponding to the analyzed security level of the electronic document to the printing paper.

The printed document exit checking step may include steps of: determining, by the illegitimate exit detection apparatus, whether the security material has been applied to the secure printed document; generating, by the illegitimate exit detection apparatus, an exit warning if the security material is detected; detecting, by the illegitimate exit detection apparatus, the security identifier printed on the secure printed document, analyzing, by the illegitimate exit detection apparatus, the detected security identifier, and requesting, by the illegitimate exit detection apparatus, an exit request, including obtained information about the printed document, from the exit management server; comparing, by the exit management server, stored information about the printed document with the exit checking request, and generating exit information; and receiving, by the illegitimate exit detection apparatus, the exit information, analyzing, by the illegitimate exit detection apparatus, the exit information, and determining, by the illegitimate exit detection apparatus, whether the secure printed document is to be exited; wherein the security identifier comprises information about the secure printed document and the unique value of the electronic document.

The method may further include a printed document exit information post-recording step of recording, by the exit management server, the information about the printed document and the unique value.

In accordance with another aspect of the present invention, there is provided an apparatus for preventing the illegitimate exit of a printed document by applying a security material, the apparatus including: an exit registration unit configured to generate information about the printed document of an electronic document and send the information to an exit management server so that the information about the printed document is registered; a security printer unit configured to print the content and security identifier of the electronic document on printing paper and generate a secure printed document by applying a security material to the printing paper; an exit management server unit configured to record and determine whether the secure printed document has been exited; and an illegitimate exit detection unit configured to detect the security material of the secure printed document, generate an exit warning, analyze the security identifier, and determine whether the secure printed document is to be exited; wherein the security identifier includes information about the printed document of the electronic document, and the information about the printed document of the electronic document includes information about a unique value that can uniquely identify the printed document.

The exit registration unit may be an exit registration apparatus; and the exit registration apparatus may include: a printed document unique value calculation unit configured to calculate the unique value of the electronic document; and a printed document information transmission unit configured to send the information about the printed document of the electronic document and the unique value to the exit management server unit.

The exit management server unit may be an exit management server; and the exit management server may include: a printed document exit pre-registration unit configured to receive the information about the printed document of the electronic document and the unique value, analyze the received information and unique value, and record information about a printed document that can be exited; and a printed document exit information post-recording unit configured to receive information about whether an attempt to perform the exit of the secure printed document has been made from the illegitimate exit detection unit, record the received information, generate exit information, including information about whether the exit of the secure printed document has been permitted, requested by the illegitimate exit detection unit, record the exit information, and send the exit information to the illegitimate exit detection unit.

The security printer unit may be a security printer; and the security printer may include: a security material application unit configured to apply the security material to the printing paper; an electronic document output unit configured to print the content of the electronic document on the printing paper; and a security identifier insertion unit configured to print the security identifier on the printing paper.

The security material application unit may include: a security material storage unit configured to maintain the security material; and a security material spray unit configured to apply the security material to the printing paper by spraying the security material onto the printing paper.

The apparatus may further include a security level determination unit configured to determine the security level of the electronic document, select the security material corresponding to the security level, and perform control so that the selected security material is applied to the printing paper via the security material spray unit.

The security identifier insertion unit may include: a printed document unique value calculation unit configured to calculate the unique value of the electronic document by analyzing the electronic document; a security identifier generation unit configured to generate the security identifier including the information about the unique value and the printed document of the electronic document in a hardly visible form; and a security identifier output unit configured to print the security identifier on the printing paper.

The illegitimate exit detection unit may be an illegitimate exit detection apparatus; and the illegitimate exit detection apparatus may include: a security material detection unit configured to detect the security material of the secure printed document; and a security identifier detection unit configured to detect the security identifier of the secure printed document, analyze the detected security identifier, send the analyzed security identifier to the exit management server unit, analyze exit information received from the exit management server unit, and determine whether or not to approve the exit of the secure printed document.

The security identifier detection unit may include: a security identifier extraction unit configured to extract the security identifier printed on the secure printed document and correct the distortion and error of the extracted security identifier; a printed document information extraction unit configured to extract the information about the printed document of the electronic document and the unique value of the electronic document from the extracted security identifier; an exit information acquisition unit configured to send the extracted information about the printed document of the electronic document and the unique value of the electronic document to the exit management unit and receive the exit information from the exit management unit; and an exit approval determination unit configured to analyze the exit information, approve the exit of the secure printed document if the secure printed document is a printed document whose exit has been approved, and reject the exit of the secure printed document if the secure printed document is a printed document whose exit has not been approved.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

The present invention may be subjected to various modifications and have various embodiments. Specific embodiments are illustrated in the drawings and described in detail below. However, it should be understood that the present invention is not intended to, be limited to these specific embodiments but is intended to encompass all modifications, equivalents and substitutions that fall within the technical spirit and scope of the present invention.

The terms used herein are used merely to describe embodiments, and not to limit the inventive concept. A singular form may include a plural form, unless otherwise defined.

Embodiments of the present invention are described in detail below with reference to the accompanying drawings.

Figure 1:
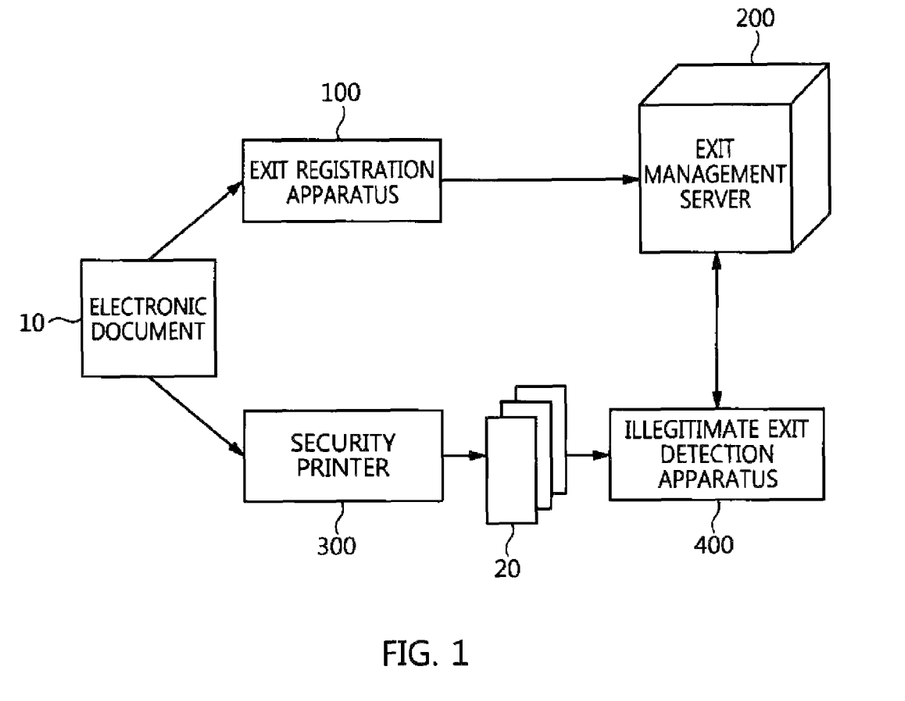
FIG. 1 is a diagram illustrating the configuration of an apparatus for preventing the illegitimate exit of a printed document by applying a security material to the printed document according to an embodiment of the present invention.

FIG. 1 is a diagram illustrating the configuration of an apparatus for preventing the illegitimate exit of a printed document by applying a security material to the printed document according to an embodiment of the present invention.

The apparatus for preventing the illegitimate exit of a printed document by applying a security material to the printed document according to the present embodiment may include an exit registration unit, an exit management server unit, a security printer unit, and an illegitimate exit detection unit.

The apparatus for preventing the illegitimate exit of a printed document by applying a security material to the printed document according to an embodiment may include all the exit registration unit, the exit management server unit, the security printer unit and the illegitimate exit detection unit, and the component units may be separate apparatuses.

In this case, the exit registration unit may be an exit registration apparatus 100, the exit management server unit may be an exit management server 200, the security printer unit may be a security printer 300, and the illegitimate exit detection unit may be an illegitimate exit detection apparatus 400.

In the following, it is assumed that the exit registration unit is the exit registration apparatus 100, the exit management server unit is the exit management server 200, the security printer unit is the security printer 300, and the illegitimate exit detection unit is the illegitimate exit detection apparatus 400 for convenience of description.

Referring to FIG. 1, whether a printed document, i.e., the output of an electronic document 10, is to be exited is recorded on the exit management server 200 via the exit registration apparatus 100. Thereafter, a secure printed document 20 is generated by outputting the electronic document 10 via the security printer 300. If an attempt to perform the exit of the secure printed document 20 is made, the illegitimate exit detection apparatus 400 determines whether the secure printed document 20 is to be exited.

If an attempt to perform the exit of an electronic document whose exit approval information has not been recorded on the exit management server 200 is made after being output via the security printer 300, the illegitimate exit detection apparatus 400 detects and blocks the illegitimate exit attempt.

Figure 2:
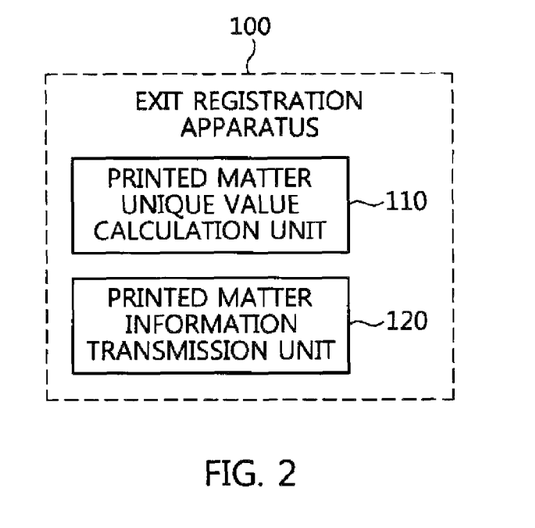
FIG. 2 is a diagram illustrating the configuration of an exit registration apparatus according to an embodiment of the present invention.

FIG. 2 is a diagram illustrating the configuration of the exit registration apparatus 100 according to an embodiment of the present invention.

The exit registration apparatus 100 according to the present embodiment generates information about the printed document of the electronic document 10, and sends the information to the exit management server 200 so that information about whether the exit of the secure printed document 20 has been approved is registered.

For this purpose, the exit registration apparatus 100 may include a printed document unique value calculation unit 110 and a printed document information transmission unit 120.

The printed document unique value calculation unit 110 generates the unique value of the electronic document 10.

The unique value refers to information that can uniquely identify the electronic document 10. For example, the unique value may be the hash value of the electronic document 10.

The printed document information transmission unit 120 sends information about the printed document and unique value of the electronic document 10 to the printed document exit pre-registration unit 210 of the exit management server 200.

Figure 3:
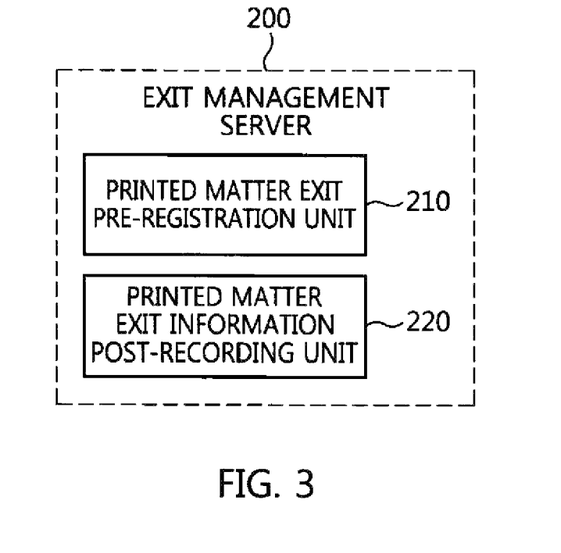
FIG. 3 is a diagram illustrating the configuration of an exit management server according to an embodiment of the present invention.

FIG. 3 is a diagram illustrating the configuration of the exit management server 200 according to an embodiment of the present invention.

The exit management server 200 according to the present embodiment functions to determine whether the secure printed document 20 is to be exited and record this information.

For this purpose, the exit management server 200 may include the printed document exit pre-registration unit 210 and a printed document exit information post-recording unit 220.

The printed document exit pre-registration unit 210 receives information about the printed document and unique value of the electronic document 10 from the exit registration apparatus 100, analyzes the information, and records information about the secure printed document 20 that can be exited.

The printed document exit information post-recording unit 220 receives information about a printed document from the exit information acquisition unit 423 of the security identifier detection unit 420 of the illegitimate exit detection apparatus 400, records whether an attempt to perform the exit of the secure printed document 20 corresponding to the information about the printed document has been made, determines whether or not to approve the exit of the secure printed document 20, generates exit information, and sends the exit information to the exit information acquisition unit 423.

In this case, the information about the printed document refers to all information about the electronic document 10. That is, the information about the printed document may include the title of an electronic document, the content of the electronic document, the date on which the electronic document was written, a person who wrote the electronic document, the security level of the electronic document, and information about whether the electronic document has been exited.

In this case, the exit information is information about whether the exit of the secure printed document 20 whose exit is being attempted has been approved, and may include information about a printed document that can be exited and a printed document that should not be exited.

Figure 4:
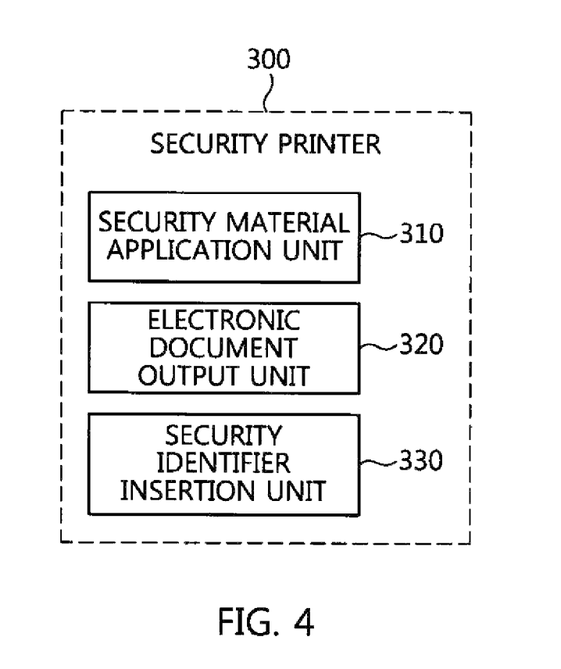
FIG. 4 is a diagram illustrating the configuration of a security printer according to an embodiment of the present invention.

FIG. 4 is a diagram illustrating the configuration of the security printer 300 according to an embodiment of the present invention.

The security printer 300 according to the present embodiment generates the secure printed document 20 by printing the content and security identifier of the electronic document 10 on printing paper and additionally applying a security material to the printing paper.

For this purpose, the security printer 300 may include a security material application unit 310, an electronic document output unit 320, and a security identifier insertion unit 330.

The security material application unit 310 applies a security material to printing paper kept in the security printer 300.

For this purpose, the security material application unit 310 may include a security material storage unit for maintaining security materials and a security material spray unit for applying a security material onto printing paper by spraying the security material onto the printing paper.

The security material storage unit may include a plurality of material storage containers for maintaining different security materials.

Furthermore, the security printer 300 according to the present embodiment may analyze the security level of the electronic document 10, and may apply a different security material to printing paper based on the analyzed security level of the electronic document 10. For this purpose, the security material application unit 310 may further include an electronic document security level determination unit.

That is, the security level determination unit determines the security level of an electronic document, selects a security material corresponding to the security level, and performs control so that the selected security material is applied to printing paper through the security material spray unit.

In this case, the security level of the electronic document may be information stored in the electronic document or may be information input to the security printer by a user when the electronic document is output to the security printer.

That is, the security printer 300 according to the present embodiment may generate the secure printed document 20 by applying a different security material to printing paper based on the security level of the electronic document 10.

In this case, the illegitimate exit detection apparatus 400 may be immediately aware if the security level of the secure printed document 20 on a detected security material.

In this case, the security material may include a variety of types of materials that can be identified by the illegitimate exit detection apparatus 400, such as a fluorescent material and a material including a specific ingredient (e.g., an inorganic material or an organic material).

Furthermore, the security level determination unit may perform control so that security materials are mixed at different ratios based on the security level of an electronic document and applied to printing paper.

For example, it is assumed that security materials A and B are contained in the security material storage unit and security levels are classified into a first grade, a second grade, a third grade, a fourth grade, and a fifth grade. If a security level in question is the first grade, only the security material A may be selected and applied to printing paper. If a security level in question is the second grade, a mixed material of 75% security material A of and 25% security material B may be generated and applied to printing paper. If a security level in question is the third grade, a mixed material of 50% security material A and 50% security material B may be generated and applied to printing paper. If a security level in question is the fourth grade, a mixed material of 25% security material A and 75% security material B may be generated and applied to printing paper. If a security level in question is the fifth grade, only the security material B may be selected and applied to printing paper.

The electronic document output unit 320 functions to output the content of the received electronic document 10.

The security identifier insertion unit 330 functions to convert information about a printed document into a security identifier form that is hardly perceptible to a cognitive visual system (i.e., that cannot be easily identified by the naked eye when printed) and print the security identifier on the secure printed document 20.

The security identifier insertion unit 330 is described in detail below with reference to FIG. 5.

Figure 5:
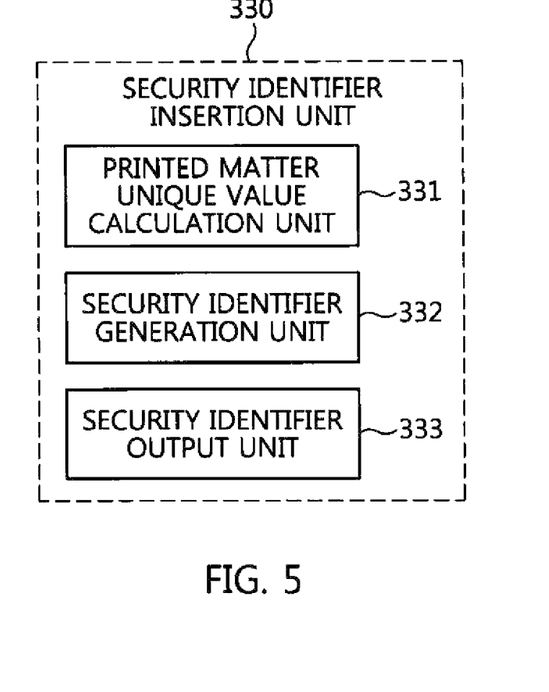
FIG. 5 is a diagram illustrating the configuration of a security identifier insertion unit according to an embodiment of the present invention.

FIG. 5 is a diagram illustrating the configuration of the security identifier insertion unit 330 according to an embodiment of the present invention.

The security identifier insertion unit 330 according to the present embodiment may include a printed document unique value calculation unit 331, a security identifier generation unit 332, and a security identifier output unit 333.

The printed document unique value calculation unit 331 calculates a unique value that can uniquely identify the electronic document 10 that is given as an input. The unique value may be the hash value of the electronic document 10.

The security identifier generation unit 332 functions to convert information about the unique value and printed document into a security identifier form that is hardly perceptible to a cognitive visual system. The security identifier may have a form including robustness to processes, such as rotation, enlargement, reduction, movement, examination, the addition of noise, partial loss, and printer scanning.

The security identifier output unit 333 functions to output the generated security identifier over the entire printed document. Alternatively, the security identifier may be printed as the background of a secure printed document.

In this case, the size of the security identifier may be smaller than that of the printed document, and a plurality of security identifiers may be output in a tile form.

Figure 6:
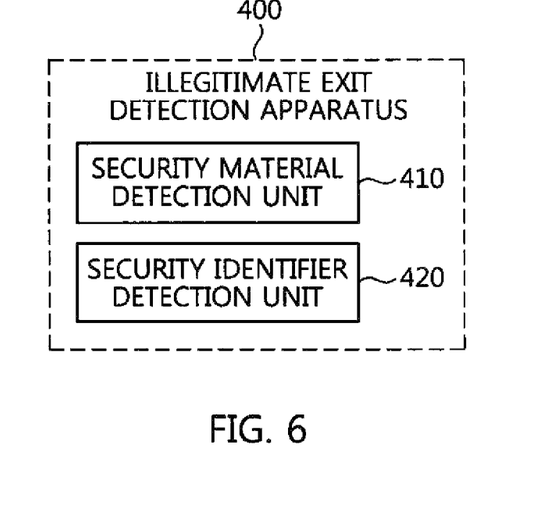
FIG. 6 is a diagram illustrating the configuration of an illegitimate exit detection apparatus according to an embodiment of the present invention.

FIG. 6 is a diagram illustrating the configuration of the illegitimate exit detection apparatus 400 according to an embodiment of the present invention.

The illegitimate exit detection apparatus 400 according to the present embodiment detects the security material of a secure printed document, issues an exit warning, and determines whether the secure printed document is to be exited.

For this purpose, the illegitimate exit detection apparatus 400 may include a security material detection unit 410 and the security identifier detection unit 420.

The security material detection unit 410 may be in the form of a gateway for examining an object to be exited, and detects a security material inserted into the secure printed document 20. When a security material is detected, the security material detection unit 410 may generate an alarm.

In this case, the security material detection unit 410 may generate a different alarm depending on the detected security material.

The security identifier detection unit 420 detects the security identifier of the secure printed document 20, analyzes the detected security identifier, sends the analyzed identifier to the exit management server 200, analyzes exit information received from the exit management server 200, and determines whether or not to approve the exit of the secure printed document 20.

The security identifier detection unit 420 is described in detail below with reference to FIG. 7.

Figure 7:
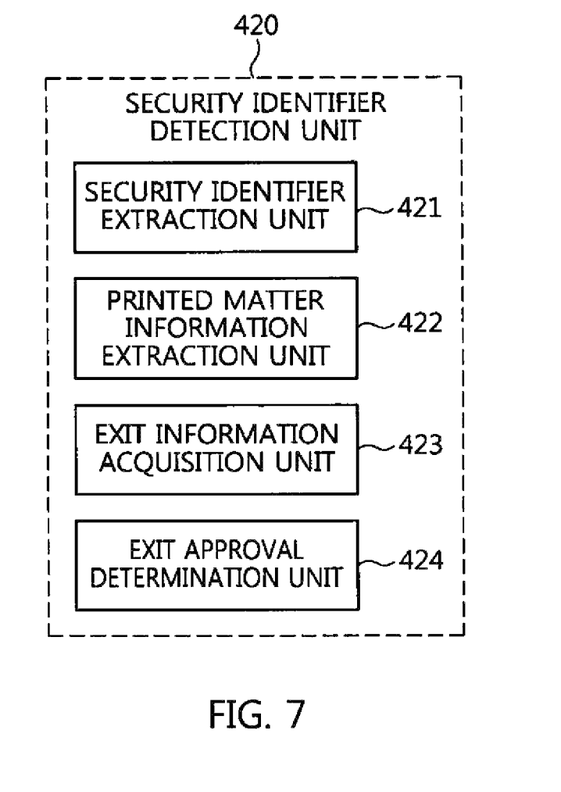
FIG. 7 is a diagram illustrating the configuration of a security identifier detection unit according to an embodiment of the present invention.

FIG. 7 is a diagram illustrating the configuration of the security identifier detection unit 420 according to an embodiment of the present invention.

The security identifier detection unit 420 according to the present invention may include a security identifier extraction unit 421, a printed document information extraction unit 422, an exit information acquisition unit 423, and an exit approval determination unit 424.

The security identifier extraction unit 421 functions to extract only the security identifier of a printed document written in the secure printed document 20 from the content and security identifier of the printed document and correct the distortion and error of the extracted security identifier.

The printed document information extraction unit 422 functions to extract information about the printed document and the unique value of the printed document from the extracted security identifier.

The exit information acquisition unit 423 functions to send the extracted information about the printed document and unique value of the printed document to the printed document exit information post-recording unit 220 of the exit management server 200 and obtain information about whether the exit of the printed document has been approved from the printed document exit information post-recording unit 220.

The exit approval determination unit 424 functions to analyze the obtained exit information, permit the exit of the printed document if the exit of the printed document has been approved, and reject the exit of the printed document if the exit of the printed document has not been approved.

In this case, when the exit of the printed document is approved or rejected, a unique alarm or notice may be generated to notify a security guard of the approval or rejection.

Figure 8:
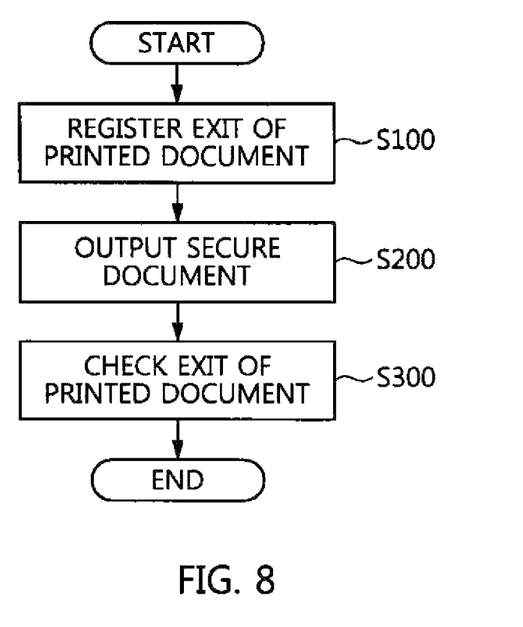
FIG. 8 is a flowchart illustrating a method of preventing the illegitimate exit of a printed document by applying a security material to the printed document according to an embodiment of the present invention.

FIG. 8 is a flowchart illustrating a method of preventing the illegitimate exit of a printed document by applying a security material to the printed document according to an embodiment of the present invention.

Step S100 is an exit registration step at which the exit registration apparatus 100 generates information about the printed document of the electronic document 10 and sends the information to the exit management server 200 so that the information is registered.

Step S200 is a secure document output step at which the security printer 300 prints the content and security identifier of the electronic document 10 on printing paper, applies a security material to the printing paper, and outputs the secure printed document 20.

Step S300 is a printed document exit checking step at which the illegitimate exit detection apparatus 400 checks the security material of the secure printed document 20, detects the security identifier, and determines whether the secure printed document 20 is to be exited.

Figure 9:
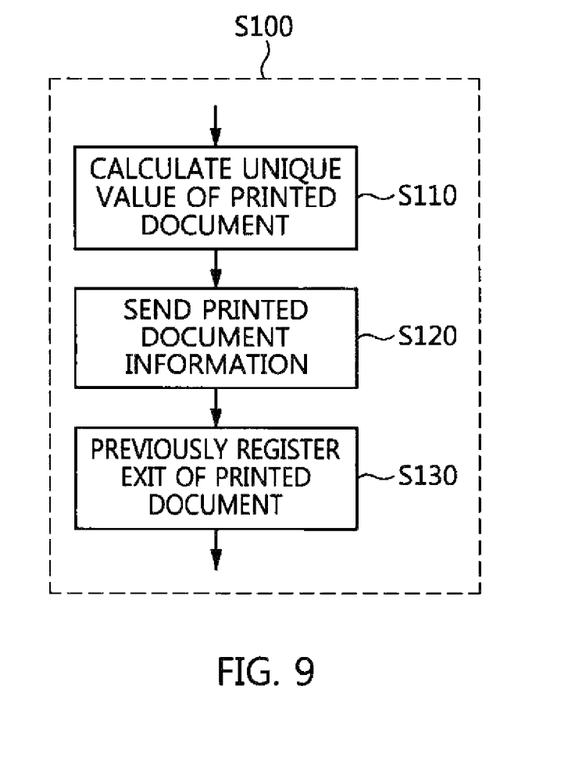
FIG. 9 is a flowchart illustrating an exit registration step according to an embodiment of the present invention.

FIG. 9 is a flowchart illustrating the exit registration step S100 according to an embodiment of the present invention.

At step S110 of calculating the unique value of a printed document, the printed document unique value calculation unit 110 of the exit registration apparatus 100 calculates a unique value that can uniquely identify the electronic document 10 that is given as an input. Thereafter, at step S120 of sending printed document information, the printed document information transmission unit 120 of the exit registration apparatus 100 sends the information about the printed document and unique value to the printed document exit pre-registration unit 210 of the exit management server 200.

Thereafter, at step S130 of previously registering the exit of a printed document, the printed document exit pre-registration unit 210 of the exit management server 200 records the received information about the printed document and the received unique value.

Figure 10:
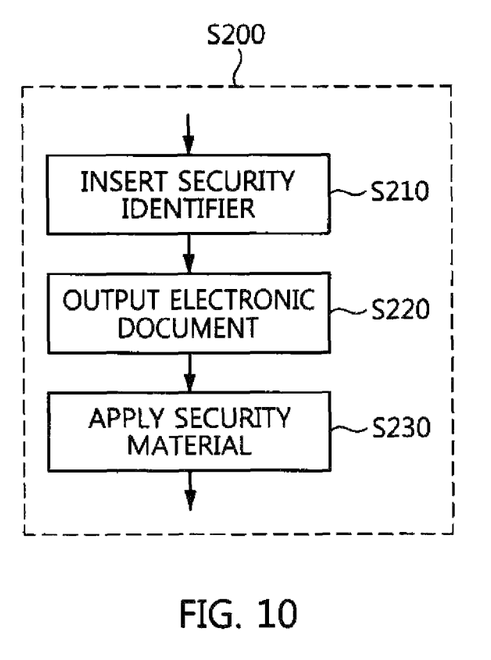
FIG. 10 is a flowchart illustrating a secure document output step according to an embodiment, of the present invention.

FIG. 10 is a flowchart illustrating the secure document output step S200 according to an embodiment of the present invention.

In the secure document output step S200, a security identifier is inserted into the printing paper at step S210, the content of the electronic document is output at step S220, a security material is applied to the printing paper at step S230, and finally a secure printed document is output.

In this case, when the security material is applied to the printing paper at step S230, the security level of the electronic document 10 may be analyzed. A different security material corresponding to the analyzed security level of the electronic document 10 may be applied to the printing paper.

Figure 11:
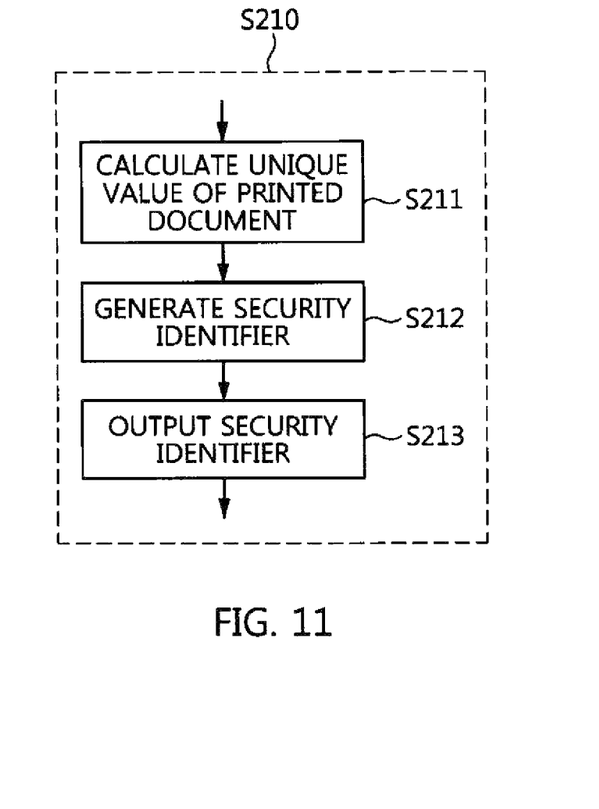
FIG. 11 is a detailed flowchart illustrating the step of inserting a security identifier illustrated in FIG. 10.

FIG. 11 is a detailed flowchart illustrating step S210 of inserting a security identifier illustrated in FIG. 10.

At step S211 of calculating the unique value of the printed document, the printed document unique value calculation unit 331 of the security identifier insertion unit 330 calculates a unique value that can uniquely identify the electronic document 10 that is given as an input. The unique value may be the hash value of the electronic document.

Thereafter, at step S212 of generating the security identifier, the information about the printed document and unique value of the electronic document 10 is converted into a security identifier form that is hardly perceptible to a cognitive visual system. The security identifier may have a form including robustness to processes, such as rotation, enlargement, reduction, movement, examination, the addition of noise, partial loss, and printer scanning.

Next, at step S213 of outputting the security identifier, the generated security identifier is printed as the entire printed document or the background of the printed document. In this case, the size of the security identifier may be smaller than that of the printed document, and a plurality of security identifiers may be output in a tile form.

Figure 12:
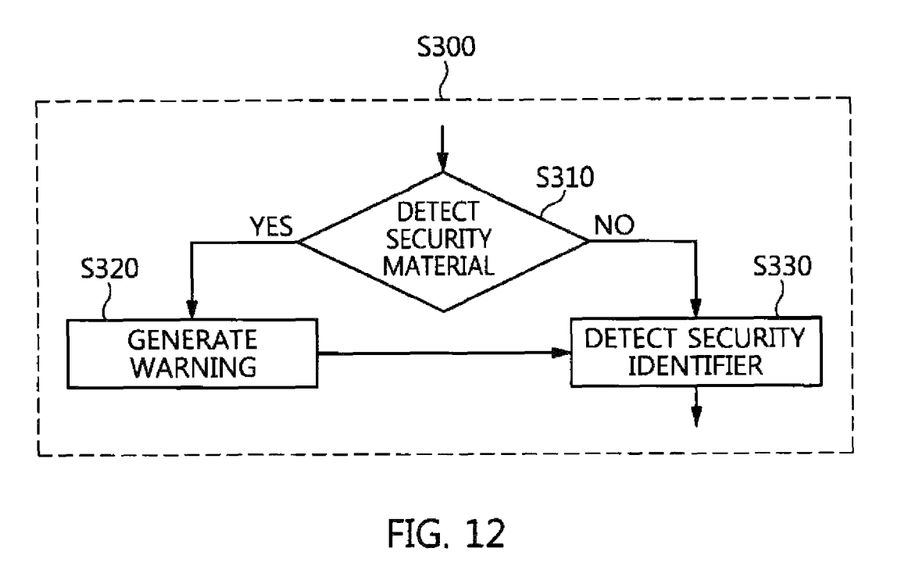
FIG. 12 is a detailed flowchart illustrating a printed document exit checking step according to an embodiment of the present invention.

FIG. 12 is a detailed flowchart illustrating the printed document exit checking step S300 according to an embodiment of the present invention.

At the printed document exit checking step S300 according to the present embodiment, when an attempt to perform the exit of the secure printed document 20 is made, the secure printed document 20 is detected, and whether or not to approve the exit of the secure printed document 20 is determined. That is, the security material of the printed document that is to be exited is detected at step S310. If the security material is detected, a warning is generated at step S320, and the process returns to step S330 of detecting a security identifier. If a person who attempts to perform the exit of the secure printed document 20 does not pass through the security material detection unit 410 while carrying the secure printed document 20, step S330 of detecting the security identifier of the secure printed document 20 may be additionally performed.

Figure 13:
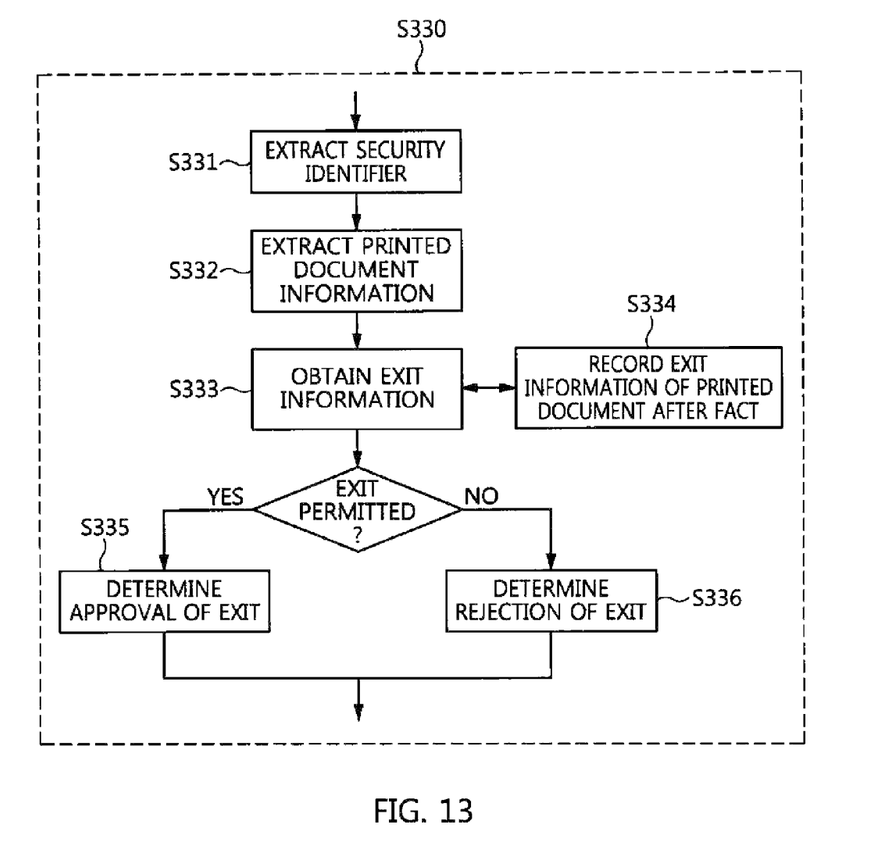
FIG. 13 is a detailed flowchart illustrating the step of detecting a security identifier illustrated in FIG. 12.

FIG. 13 is a detailed flowchart illustrating step S330 of detecting a security identifier illustrated in FIG. 12.

At step S331 of extracting a security identifier, only the security identifier of a printed document is extracted from the content and security identifier of the printed document, and the distortion and error of the extracted security identifier are corrected.

Thereafter, at step S332 of extracting information about the printed document, information about the printed document and unique value of the electronic document 10 is extracted from the extracted security identifier.

Thereafter, at step S333 of obtaining exit information, the extracted information about the printed document and unique value of the electronic document 10 is sent to the printed document exit information post-recording unit 210 of the exit management server 200. Printed matter exit information is obtained from the printed document exit information post-recording unit 210.

In this case, the exit management server 200 generates the exit information by comparing previously stored information about the printed document with an exit checking request received from the illegitimate exit detection apparatus 400.

At step S334 of recording printed document exit information after the fact, the information about the printed document and unique value of the electronic document is received from step S333 of obtaining exit information. Whether an attempt to perform the exit of the secure printed document 20 corresponding to the information about the printed document and unique value has been made is recorded. Whether or not to approve the exit of the secure printed document 20 is determined. Exit approval information is sent to step S333 of obtaining exit information.

Thereafter, if the exit of the printed document is permitted at step S333 of obtaining exit information, the approval of the exit of the printed document is determined at step S335 of determining exit approval. In this case, at step S335 of determining exit approval, a unique alarm or notice indicating the approval of exit may be generated.

Furthermore, if the exit of the secure printed document 20 is rejected at step S333 of obtaining exit information, the rejection of the exit of the secure printed document 20 is determined at step S336 of determining the rejection of exit. In this case, at step S336 of determining the rejection of exit, a unique alarm or notice indicating the rejection of exit may be generated.

As described above, at least one embodiment of the present invention is advantageous in that it can prevent the illegitimate exit of an output confidential document or drawing by performing approval for printed document exit, the prevention of the illegitimate exit of the printed document, and the information recording of the printed document depending on whether the exit of the printed document has been permitted.

Furthermore, at least one embodiment of the present invention is advantageous in that it can provide a method and apparatus for generating a secure printed document, in which the content of an electronic document is printed on common printing paper, information about the electronic document is converted into a security identifier hardly perceptible to a cognitive visual system, the security identifier is printed on the common printing paper, and a security material is applied to the printing paper.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A method of preventing illegitimate exit of a printed document by applying a security material, the method comprising:
   an exit registration step of generating, by an exit registration apparatus, information about a printed document of an electronic document and sending, by the exit registration apparatus, the information to an exit management server so that, the information about the printed document is registered;
   a secure document output step of printing, by a security printer, content of the electronic document and a security identifier of the electronic document on printing paper, applying, by the security printer, a security material to the printing paper, and outputting, by the security printer, a secure printed document; and
   a printed document exit checking step of checking, by an illegitimate exit detection apparatus, whether the security material has been applied to the secure printed document, detecting, by the illegitimate exit detection apparatus, the security identifier, and determining, by the illegitimate exit detection apparatus, whether the secure printed document is to be exited;
   wherein the security identifier comprises the information about the printed document of the electronic document, and the information about the printed document of the electronic document comprises information about a unique value that can uniquely identify the printed document.

2. The method of claim 1, wherein the exit registration step comprises steps of:
   generating the unique value that can uniquely identify the electronic document;
   sending the information about the printed document, including the unique value, to the exit management server; and
   registering, by the exit management server, the information about the printed document.

3. The method of claim 1, wherein the secure document output step comprises steps of:
   printing, by the security printer, the security identifier on the printing paper;
   printing the content of the electronic document on the printing paper; and
   applying the security material to the printing paper.

4. The method of claim 3, wherein the step of printing, by the security printer, the security identifier on the printing paper comprises steps of:
   calculating the unique value that is information about the electronic document and information that can identify the electronic document;
   generating the security identifier corresponding to the unique value; and
   printing the security identifier on the printing paper, and outputting the printing paper.

5. The method of claim 3, wherein the step of applying the security material to the printing paper comprises steps of:
analyzing a security level of the electronic document; and
applying a different security material corresponding to the analyzed security level of the electronic document to the printing paper.

6. The method of claim 1, wherein the printed document exit checking step comprises steps of:
determining, by the illegitimate exit detection apparatus, whether the security material has been applied to the secure printed document;
generating, by the illegitimate exit detection apparatus, an exit warning if the security material is detected;
detecting, by the illegitimate exit detection apparatus, the security identifier printed on the secure printed document, analyzing, by the illegitimate exit detection apparatus, the detected security identifier, and requesting, by the illegitimate exit detection apparatus, an exit request, including obtained information about the printed document, from the exit management server;
comparing, by the exit management server, stored information about the printed document with the exit checking request, and generating exit information; and
receiving, by the illegitimate exit detection apparatus, the exit information, analyzing, by the illegitimate exit detection apparatus, the exit information, and determining, by the illegitimate exit detection apparatus, whether the secure printed document is to be exited;
wherein the security identifier comprises information about the secure printed document and the unique value of the electronic document.

7. The method of claim 6, further comprising a printed document exit information post-recording step of recording, by the exit management server, the information about the printed document and the unique value.

8. An apparatus for preventing illegitimate exit of a printed document by applying a security material, the apparatus comprising:
an exit registration unit configured to generate information about a printed document of an electronic document and send the information to an exit management server so that the information about the printed document is registered;
a security printer unit configured to print content of the electronic document and a security identifier of the electronic document on printing paper and generate a secure printed document by applying a security material to the printing paper;
an exit management server unit configured to record and determine whether the secure printed document has been exited; and
an illegitimate exit detection unit configured to detect the security material of the secure printed document, generate an exit warning, analyze the security identifier, and determine whether the secure printed document is to be exited;
wherein the security identifier comprises information about the printed document of the electronic document, and the information about the printed document of the electronic document comprises information about a unique value that can uniquely identify the printed document.

9. The apparatus of claim 8, wherein:
the exit registration unit is an exit registration apparatus; and
the exit registration apparatus comprises:
a printed document unique value calculation unit configured to calculate the unique value of the electronic document; and
a printed document information transmission unit configured to send the information about the printed document of the electronic document and the unique value to the exit management server unit.

10. The apparatus of claim 8, wherein:
the exit management server unit is an exit management server; and
the exit management server comprises:
a printed document exit pre-registration unit configured to receive the information about the printed document of the electronic document and the unique value, analyze the received information and unique value, and record information about a printed document that can be exited; and
a printed document exit information post-recording unit configured to receive information about whether an attempt to perform the exit of the secure printed document has been made from the illegitimate exit detection unit, record the received information, generate exit information, including information about whether the exit of the secure printed document has been permitted, requested by the illegitimate exit detection unit, record the exit information, and send the exit information to the illegitimate exit detection unit.

11. The apparatus of claim 8, wherein:
the security printer unit is a security printer; and
the security printer comprises:
a security material application unit configured to apply the security material to the printing paper;
an electronic document output unit configured to print the content of the electronic document on the printing paper; and
a security identifier insertion unit configured to print the security identifier on the printing paper.

12. The apparatus of claim 11, wherein the security material application unit comprises:
a security material storage unit configured to maintain the security material; and
a security material spray unit configured to apply the security material onto the printing paper by spraying the security material onto the printing paper.

13. The apparatus of claim 12, further comprising a security level determination unit configured to determine a security level of the electronic document, select the security material corresponding to the security level, and perform control so that the selected security material is applied to the printing paper via the security material spray unit.

14. The apparatus of claim 11, wherein the security identifier insertion unit comprises:
a printed document unique value calculation unit configured to calculate the unique value of the electronic document by analyzing the electronic document;
a security identifier generation unit configured to generate the security identifier including the information about the unique value and the printed document of the electronic document in a hardly visible form; and
a security identifier output unit configured to print the security identifier on the printing paper.

15. The apparatus of claim 8, wherein:
the illegitimate exit detection unit is an illegitimate exit detection apparatus; and the illegitimate exit detection apparatus comprises:
a security material detection unit configured to detect the security material of the secure printed document; and
a security identifier detection unit configured to detect the security identifier of the secure printed document, analyze the detected security identifier, send the analyzed security identifier to the exit management server unit, analyze exit information received from the exit management server unit, and determine whether or not to approve the exit of the secure printed document.

16. The apparatus of claim 15, wherein the security identifier detection unit comprises:
a security identifier extraction unit configured to extract the security identifier printed on the secure printed document and correct distortion and error of the extracted security identifier;
a printed document information extraction unit configured to extract the information about the printed document of the electronic document and the unique value of the electronic document from the extracted security identifier;
an exit information acquisition unit configured to send the extracted information about the printed document of the electronic document and the unique value of the electronic document to the exit management unit and receive the exit information from the exit management unit; and
an exit approval determination unit configured to analyze the exit information, approve the exit of the secure printed document if the secure printed document is a printed document whose exit has been approved, and reject the exit of the secure printed document if the secure printed document is a printed document whose exit has not been approved.

* * * * *